(12) United States Patent
Kim et al.

(10) Patent No.: US 7,936,899 B2
(45) Date of Patent: May 3, 2011

(54) APPARATUS AND METHOD FOR WATERMARKING USING ELEMENTAL IMAGES OF INTEGRATED IMAGE HAVING THREE-DIMENSIONAL INFORMATION

(75) Inventors: Eun-Soo Kim, Seoul (KR);
Dong-Choon Hwang, Yeosu-si (KR);
Dong-Hak Shin, Seoul (KR)

(73) Assignee: Kwangwoon University Research Institute for Industry Cooperation, Seoul (KR)

( * ) Notice: Subject to any disclaimer, the term of this patent is extended or adjusted under 35 U.S.C. 154(b) by 956 days.

(21) Appl. No.: 11/880,224

(22) Filed: Jul. 19, 2007

(65) Prior Publication Data
US 2008/0025564 A1      Jan. 31, 2008

(30) Foreign Application Priority Data

Jul. 20, 2006   (KR) .................. 10-2006-0067969

(51) Int. Cl.
*G06K 9/00* (2006.01)
*G06K 9/36* (2006.01)

(52) U.S. Cl. ....................... 382/100; 382/232

(58) Field of Classification Search .......... 382/100, 382/103, 154, 210, 232, 251; 380/51; 375/130; 359/1–2; 345/550, 419; 348/40, 294, 308, 348/460; 713/176
See application file for complete search history.

(56) References Cited

U.S. PATENT DOCUMENTS

| | | | | |
|---|---|---|---|---|
| 6,104,812 A * | 8/2000 | Koltai et al. | ................. | 380/51 |
| 6,882,737 B2 * | 4/2005 | Lofgren et al. | ................ | 382/100 |
| 6,975,733 B1 * | 12/2005 | Choi et al. | ................... | 381/100 |
| 7,688,994 B2 * | 3/2010 | Yadid-Pecht et al. | ......... | 382/100 |
| 2007/0019090 A1 * | 1/2007 | Yadid-Pecht et al. | ......... | 348/308 |
| 2007/0024872 A1 * | 2/2007 | Salgado | ..................... | 358/1.1 |
| 2007/0127771 A1 * | 6/2007 | Kaneda et al. | ................ | 382/100 |
| 2008/0166016 A1 * | 7/2008 | Sibiryakov et al. | ........... | 382/103 |
| 2008/0273861 A1 * | 11/2008 | Yang et al. | ..................... | 386/95 |
| 2009/0160985 A1 * | 6/2009 | Javidi et al. | ................... | 348/294 |
| 2010/0098326 A1 * | 4/2010 | Abeloe | ........................ | 382/154 |

OTHER PUBLICATIONS

Rodrigo Ponce-Diaz, et al., "Digital Reconstruction of Integral Three Dimension Imaging by Simple Quadruple Pixel Extraction",18th Annual Meeting of the IEEE Digital Object Identifier: 10.1109/LEOS.2005.1548124 Publication Year: 2005, pp. 569-570.*

* cited by examiner

*Primary Examiner* — Samir A Ahmed
*Assistant Examiner* — Mehdi Rashidian
(74) *Attorney, Agent, or Firm* — Knobbe Martens Olson & Bear LLP (57) ABSTRACT

An apparatus and method for watermarking that uses elemental images of an integrated image having three-dimensional information as a watermark are disclosed. The watermarking apparatus in accordance with an embodiment of the present invention includes i) a computational pickup unit, which picks up an elemental image watermark computationally by placing an object three-dimensionally, ii) an embedding process unit, which embeds into a two-dimensional image the elemental image watermark obtained by the computational pickup unit, iii) an extraction process unit, which extracts the elemental image watermark by receiving through a transmission channel the watermarked two-dimensional image embedded by the embedding process unit, and iv) a computational reconstruction unit, which computationally reconstructs the elemental image watermark extracted by the extraction process unit to a distance-based image.

9 Claims, 11 Drawing Sheets

APPARATUS AND METHOD FOR WATERMARKING USING ELEMENTAL IMAGES OF INTEGRATED IMAGE HAVING THREE-DIMENSIONAL INFORMATION

CROSS-REFERENCE TO RELATED PATENT APPLICATIONS

This application claims the benefit of Korean Patent Application No. 10-2006-0067969, filed on Jul. 20, 2007, in the Korean Intellectual Property Office, the disclosure of which is incorporated herein in its entirety by reference.

BACKGROUND OF THE INVENTION

1. Field of the Invention

The present invention relates to a watermarking apparatus and method using elemental images of an integrated image having three-dimensional information as a watermark. More specifically, the present invention relates to a watermarking apparatus and method that use an integrated image technology to suggest a technique of using elemental images, which are picked up from three-dimensional information, as a new watermark for data protection, thereby addressing various attacks on the watermark by dispersing embedded information and reconstructing the embedded information with some of the information.

2. Description of the Related Technology

The digital watermarking technology usually refers to a process of embedding and hiding a watermark, which is a kind of ownership information that is not visible to human eyes, in a digital image. The digital watermarking technology provides a method for preventing illegal use and handling of a digital image and authenticating the ownership.

The area in which the object data is changed in the digital watermarking technology has evolved from the conventional spatial area to the more recent frequency area. Recently, a new technology of watermarking frequency data has been introduced.

To watermark data in a frequency area, the discrete cosine transform (DCT), discrete Fourier transform (DFT) and discrete wavelet transform (DWT) are commonly used. The digital watermarking technology requires that the hidden watermark is not visible to human eyes, is robust to a variety of image processing algorithms, and is free from illegal modification or forgery. The conventional watermarking technology, however, used a two-dimensional image, making it vulnerable to a variety of attacks.

SUMMARY OF CERTAIN INVENTIVE ASPECTS

One aspect of the present invention provides a method of using an integrated image technology to use elemental images picked up from three-dimensional information as a new watermark for protecting information.

Another aspect of the present invention provides a watermarking apparatus and method, which can address various attacks on the watermark by dispersing the embedded information and reconstructing the embedded information with a portion of the information, using elemental images of an integrated image having three-dimensional information as a watermark.

Another aspect of the present invention features a watermarking apparatus that uses elemental images of an integrated image having three-dimensional information as a watermark. The watermarking apparatus in accordance with an embodiment of the present invention has a computational pickup unit, which picks up an elemental image watermark computationally by placing an object three-dimensionally, an embedding process unit, which embeds into a two-dimensional image the elemental image watermark obtained by the computational pickup unit, an extraction process unit, which extracts the elemental image watermark by receiving through a transmission channel the watermarked two-dimensional image embedded by the embedding process unit, and a computational reconstruction unit, which computationally reconstructs the elemental image watermark extracted by the extraction process unit to a distance-based image.

The computational pickup unit can obtain the elemental image watermark by direct pickup, which obtains elemental images by photographing an actual object, or by computational reconstruction pickup, which produces elemental images by constructing a virtual three-dimensional object.

The embedding process unit can include a random sequence generator, which generates a random sequence for the elemental image watermark obtained by the computational pickup unit and rearranges the elemental image watermark, a DWT unit, which performs a DWT on a two-dimensional image, a quantization unit, which quantizes an output of the DWT unit; and an inverse DWT (IDWT) unit, which is inputted with the rearranged elemental image watermark outputted by the random sequence generator and outputs a watermarked two-dimensional image by being inputted with a value quantized by the quantization unit and performing IDWT.

The extraction process unit can include a DWT unit, which performs DWT on the watermarked 2D image, a quantization unit, which quantizes an output of the DWT unit, an operation unit, which performs an operation on an output of the quantization unit and extracts a rearranged elemental image watermark, and a random sequence generator, which generates a random sequence on the rearranged elemental image watermark extracted by the operation unit and obtains an elemental image watermark.

The computational pickup unit can computationally reconstruct an image from elemental images by modeling a pinhole arrangement.

Still another aspect of the present invention features a method of watermarking that uses elemental images of an integrated image having three-dimensional information as a watermark. The watermarking method in accordance with an embodiment of the present invention executes i) computationally picking up an elemental image watermark by placing an object three-dimensionally, ii) embedding the elemental image watermark obtained by the computationally picking up into a two-dimensional image, iii) extracting the elemental image watermark by receiving through a transmission channel the watermarked two-dimensional image embedded by the embedding and iv) computationally reconstructing the elemental image watermark extracted by the extracting to a distance-based image.

The step of computationally picking up can obtain the elemental image watermark by direct pickup, which obtains elemental images by photographing an actual object, or by computational reconstruction pickup, which produces elemental images by constructing a virtual three-dimensional object.

The step of embedding can include the steps of: generating a random sequence for the elemental image watermark obtained by the step of computationally picking up and rearranging the elemental image watermark; performing DWT on a two-dimensional image; quantizing an output from the step of performing DWT; and performing inverse DWT (IDWT), being inputted with the rearranged elemental image watermark outputted by the step of generating a random sequence and outputting a watermark-embedded two-dimensional image by being inputted with a value quantized by the step of quantizing and performing IDWT.

The step of extracting can include the steps of: performing DWT on the watermarked 2D image; quantizing an output from the step of performing DWT; performing an operation on an output from the step of quantizing and extracting a rearranged elemental image watermark; and generating a random sequence on the rearranged elemental image watermark extracted by the step of operating and obtaining an elemental image watermark.

The step of computationally picking up can computationally reconstruct an image from elemental images by modeling a pinhole arrangement.

Another aspect of the invention provides a watermarking apparatus using elemental images of an integrated image having three-dimensional information as a watermark, the watermarking apparatus comprising: i) a pickup configured to computationally pick up an elemental image watermark by three-dimensionally placing an object, ii) a first processor configured to embed the elemental image watermark into a two-dimensional image, iii) a second processor configured to extract the embedded elemental image watermark from the two-dimensional image and iv) a third processor configured to computationally reconstruct the extracted elemental image watermark to a distance-based image.

In one embodiment, the pickup is further configured to obtain the elemental image watermark by direct pickup, which obtains elemental images by photographing an actual object, or by computational reconstruction pickup, which produces elemental images by constructing a virtual three-dimensional object.

In one embodiment, the first processor comprises: i) a random sequence generator configured to generate a random sequence for the elemental image watermark and rearrange the elemental image watermark, ii) a discrete wavelet transform (DWT) unit configured to perform DWT function on a two-dimensional image, iii) a quantizer configured to quantize an output of the DWT unit and iv) an inverse DWT (IDWT) unit configured to i) receive the rearranged elemental image watermark and the quantized value, ii) perform IDWT function on the received data, and iii) output a watermarked two-dimensional image.

In one embodiment, the pickup is further configured to computationally reconstruct an image from elemental images by modeling a pinhole arrangement. In one embodiment, the second processor is further configured to extract the embedded elemental image watermark by passing the two-dimensional image through a transmission channel.

Still another aspect of the invention provides a method of watermarking using elemental images of an integrated image having three-dimensional information as a watermark, the method comprising: i) computationally picking up an elemental image watermark by three-dimensionally placing an object, ii) embedding the elemental image watermark into a two-dimensional image, iii) obtaining the embedded elemental image watermark from the two-dimensional image and iv) computationally reconstructing the obtained elemental image watermark to a distance-based image.

In one embodiment, the computationally picking up obtains the elemental image watermark by direct pickup, which obtains elemental images by photographing an actual object, or by computational reconstruction pickup, which produces elemental images by constructing a virtual three-dimensional object.

In one embodiment, the embedding comprises: i) generating a random sequence for the elemental image watermark and rearranging the elemental image watermark, ii) performing discrete wavelet transform (DWT) function on a two-dimensional image, iii) quantizing the two-dimensional image, iv) receiving the rearranged elemental image watermark and the quantized value v) performing inverse DWT (IDWT) function on the received data and vi) outputting a watermarked two-dimensional image.

In one embodiment, wherein the picking up computationally reconstructs an image from elemental images by modeling a pinhole arrangement. In one embodiment, the obtaining comprises extracting the embedded elemental image watermark by passing the two-dimensional image through a transmission channel.

Still another aspect of the invention provides a watermarking apparatus using elemental images of an integrated image having three-dimensional information as a watermark, the watermarking apparatus comprising: i) means for computationally picking up an elemental image watermark by three-dimensionally placing an object, ii) means for embedding the elemental image watermark into a two-dimensional image, iii) means for obtaining the embedded elemental image watermark from the two-dimensional image and iv) means for computationally reconstructing the obtained elemental image watermark to a distance-based image.

DESCRIPTION OF CERTAIN INVENTIVE EMBODIMENTS

Hereinafter, some embodiments of a watermarking apparatus and method using elemental images of an integrated image having three-dimensional information as a watermark in accordance with embodiments of the present invention will be described with reference to accompanying drawings. In describing embodiments of the present invention, any detailed description of a related function or structure of common knowledge will be omitted if the description is deemed unnecessary embodiments of the present invention. The terms used in the following description are defined by considering their functions in embodiments of the present invention, and can vary according to the user, intention of the user or case.

The meaning of each term, therefore, should be interpreted within the overall context of this specification.

In general, the digital watermarking technology requires that the hidden watermark is not visible to human eyes, is robust to a variety of image processing algorithms, and is free from illegal modification or forgery. The conventional watermarking technology used a two-dimensional image, making it vulnerable to a variety of attacks. In one embodiment of the present invention, therefore, an integrated image, instead of the conventional two-dimensional image, is used for a watermark.

At least one embodiment of the present invention provides a technique of using elemental images, which are picked up from three-dimensional information using an integrated image technology, as a new watermark for protection of information. If elemental images are used as a watermark, the embedded information can be dispersed, like the holographic method, due to the three-dimensional information included therein. If the watermark is embedded with dispersed information, it becomes possible to use some of the information, not all of the information, of the watermark to reconstruct the embedded information.

Since its first introduction by Lippman in 1908, there has been a number of studies on the integrated image (or integrated photography, i.e., IP) method.

Figure 1:
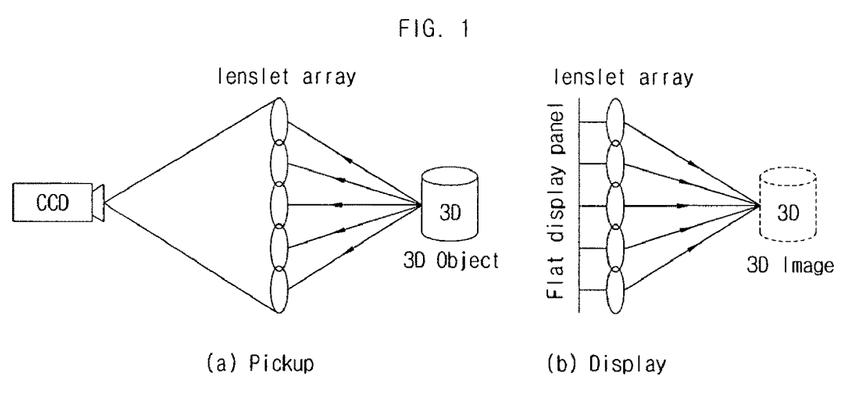
FIG. 1 shows the principle of a typical three-dimensional integrated image system.

FIG. 1 illustrates the principle of a typical three-dimensional integrated image system.

As shown in FIG. 1, an integrated image generally consists of a pickup process and a display process. The pickup process of an integrated image is arranged with a two-dimensional sensor and a lenslet array. Here, a limited amount of light entered through three-dimensional objects is picked up through the lenslet array. At this time, the light is stored through the two-dimensional image sensor as a digital image having information of each of the three-dimensional objects.

On the other hand, the display process of an integrated image is the reverse of the pickup process. The digital image having elemental images is displayed on a display device for reconstructing three-dimensional images and is displayed in the front side of the lenslet array.

A reconstructing method using a computer that models an optical reconstructing method of elemental images has been also studied and reported. In this reconstructing method, the three-dimensional image is reconstructed on a plane that is placed at a certain distance.

Figure 2:
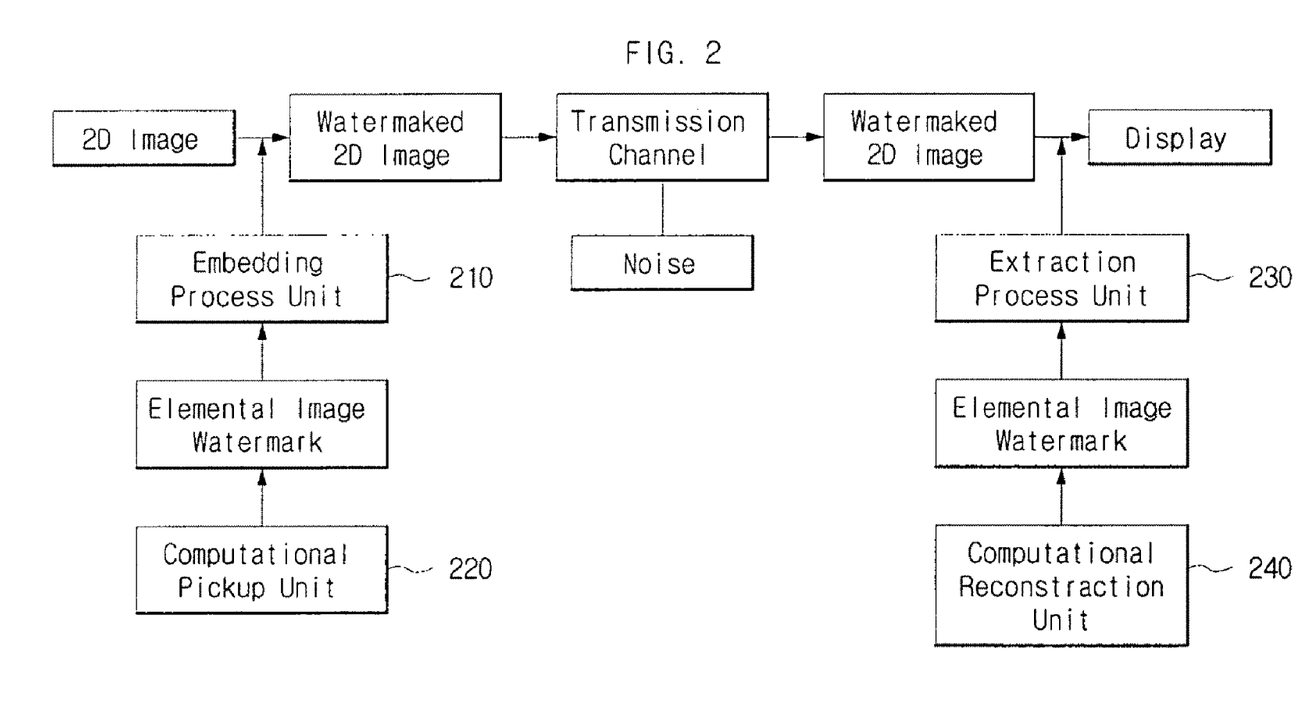
FIG. 2 shows a block diagram of a watermarking apparatus and method using elemental images of an integrated image having three-dimensional information as a watermark in accordance with an embodiment of the present invention.

FIG. 2 is a block diagram showing a watermarking apparatus and method using elemental images of an integrated image having three-dimensional information as a watermark in accordance with an embodiment of the present invention.

The image to which the watermark is to be embedded is a two-dimensional digital image.

Since the watermark uses elemental images obtained by a computational pickup unit 220 through the integrated image technology, the embedded information is made to elemental images through a computational pickup process. Such elemental images will be referred to as an elemental image watermark, hereinafter.

The elemental image watermark is embedded into the digital image by an embedding process unit 210 and then transferred to a receiving terminal through a transmission terminal. At this time, a variety of external noise is added.

An extraction process unit 230 of the receiving terminal extracts the watermark from the transferred two-dimensional digital image.

The elemental image watermark pattern is reconstructed to images having different distances, using a computational reconstruction technique by a computational reconstruction unit 240.

1. Generating a Watermark Using a Computational Generation Pickup Process

In general, two-dimensional data has been used for the watermark. The watermark used by this technology, however, has three-dimensional information.

Figure 3A:
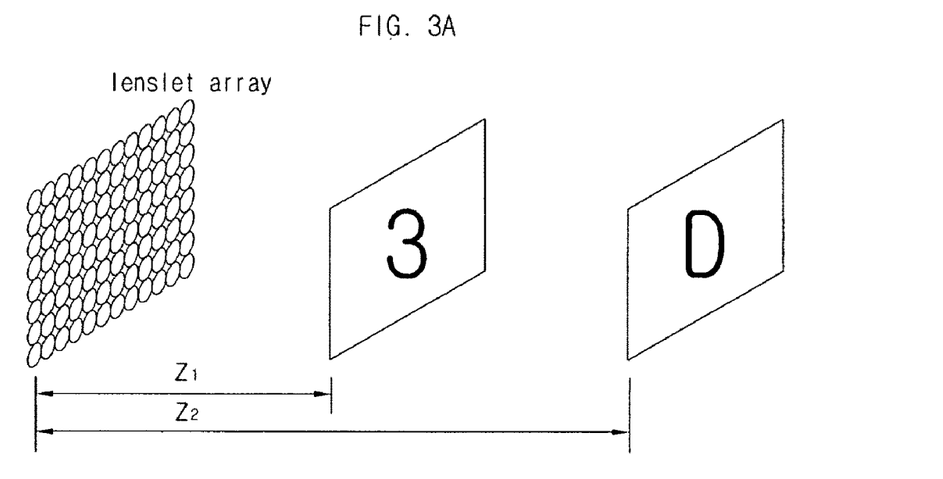
FIG. 3 shows a conceptual diagram of operational examples of a computational pickup unit shown in FIG. 2.
Figure 3B:
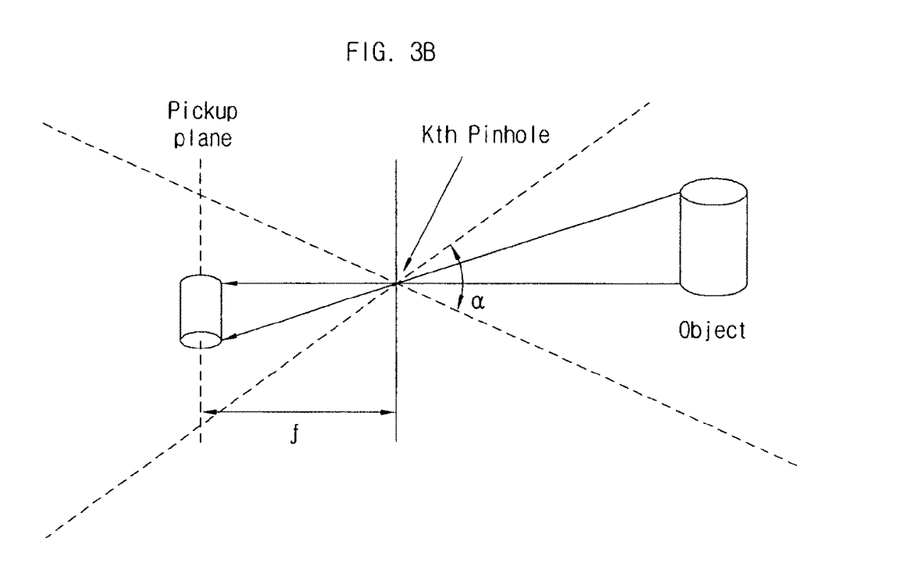

FIG. 3 is a conceptual diagram showing an operational example of the computational pickup unit shown in FIG. 2.

The elemental images, therefore, are obtained by placing objects three-dimensionally, as shown in FIG. 3(*a*).

There have been two pickup methods for the integrated image. In the first method, called the direct pickup method, an actual object is photographed to generate elemental images. In the second method, called the computational generation (CG) method, a virtual 3D object is constructed to generate elemental images.

FIG. 3(*b*) illustrates a CG pickup method according to one embodiment of the present invention for generating the elemental image watermark. Here, it is also possible to use the elemental images obtained by the direct pickup method as the watermark.

If the embedded information is picked up for elemental images through the CG method on a $k^{th}$ pin hole, the object is projected as an inversed image on a pickup plane through the pin hole. Obtained by repeating the same method for every pin hole are the entire elemental images, which become the watermark.

2. Embedding an Elemental Image Watermark

Figure 4:
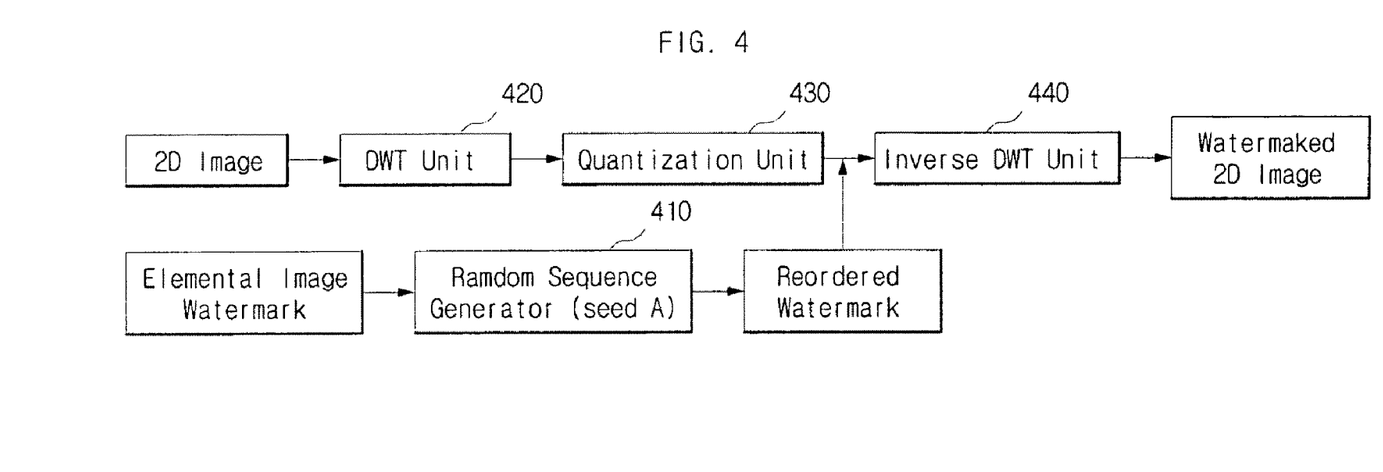
FIG. 4 shows a block diagram of an operational example of an embedding process unit shown in FIG. 2.

FIG. 4 is a block diagram showing an operational example of the embedding process shown in FIG. 2. FIG. 4 illustrates the method of watermarking that embeds an elemental image watermark.

While a two-dimensional watermark is embedded in the conventional watermarking studies, at least one embodiment of the present invention uses an elemental image watermark instead of the two-dimensional watermark.

First, a 2D digital image, to which the watermark is to be embedded, is filtered to high-frequency components and low-frequency components by use of a high bandwidth passage filter and a low bandwidth passage filter through a DWT process. A DWT unit 420 chronologically divides the given 2D data according to the frequency component and concentrates the energy of the image in the low frequency area to construct images of 4 different sub-bands having stratum information from a low-frequency sub-band to a high-frequency sub-band.

Figure 5A:
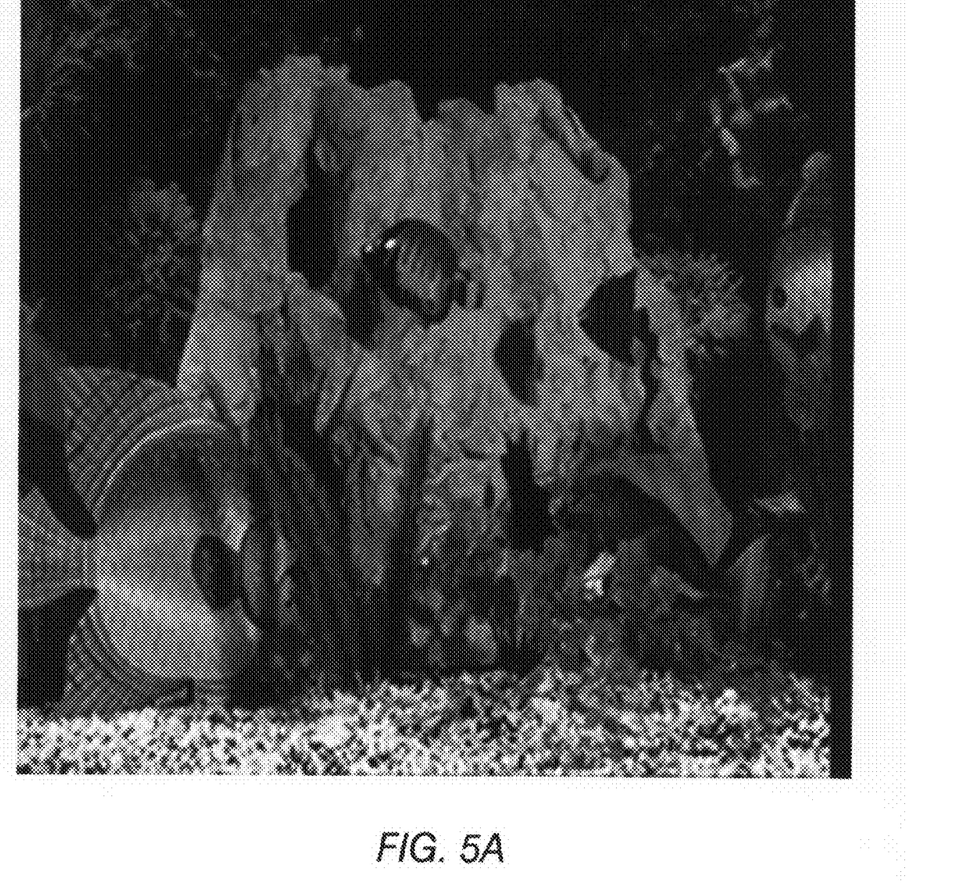
FIG. 5 shows examples of an image embedded by the embedding process unit shown in FIG. 4.
Figure 5B:
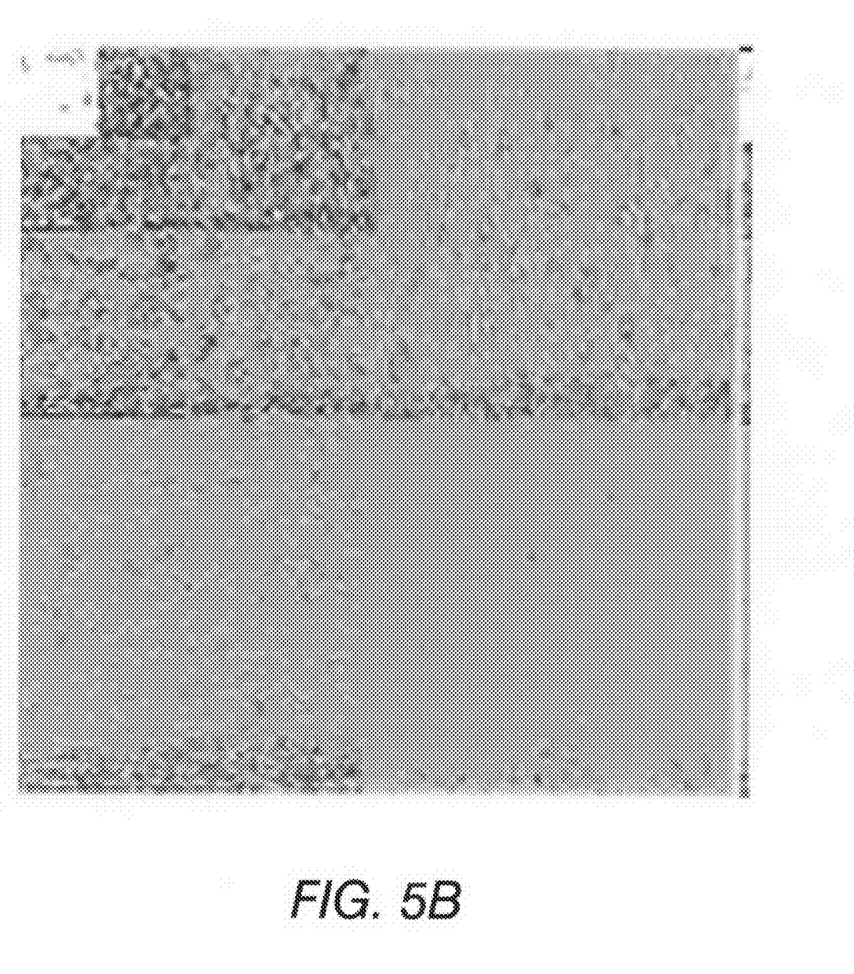

FIG. 5 shows examples of an image embedded by the embedding process shown in FIG. 4. FIG. 5(*a*) illustrates an example of a 2D digital image, to which the watermark is to be embedded, and FIG. 5(*b*) illustrates an example of an image resulted from an actual 3-level DWT.

Then, the DWT coefficient is quantized at a quantization unit 430, and then the elemental image watermark is embedded. At this time, the elemental image watermark is rearranged by use of a random sequence generator 410 in order to make the elemental image watermark robust against an attack on a spatial area. To reconstruct the rearranged elemental image watermark, seed values are assigned, and the random sequence is generated only when the seeds are the same.

If the rearranged elemental image watermark is assumed to be X, a watermark insertion algorithm shown in EQ. 1 is used. The quantized DWT coefficient is made to be an even number, and if the watermark is 1, the DWT coefficient is changed to an odd number, and if the watermark is 0, the DWT coefficient is not changed. Using this principle, the elemental image watermark is extracted without using the original image.

$$t'_{L+i}=((t_{L+i}\lceil 2)s2)+X \text{ (where } i=1,2,\ldots,K) X=\{x_1,x_2,\ldots x_K\} \quad \text{EQ. 1}$$

where t' is a pixel value after the watermark is embedded, $t_L$ and $t_M$ are a starting point and an ending point, respectively, of a middle frequency component, to which the elemental image watermark is embedded, and K is the number of pixels of the watermark.

By replacing the obtained $t'_{L+i}$ with the existing DWT coefficient $t_{L+i}$, a new DWT coefficient $F^*(u,v)$, to which the watermark is embedded, is obtained, as shown in EQ. 2.

Then, through an inverse DWT unit 440, a final image, to which the watermark is embedded, is generated.

$$F^*(u,v)=\{t_1,t_2,\ldots,t_L,t'_{L+1},t'_{L+2},\ldots,t'_{L+M},t_{L+M+1},t_{L+M+2},\ldots,t_{64}\} \quad \text{EQ. 2}$$

3. Extracting the Watermark of an Elemental Image

Figure 6:
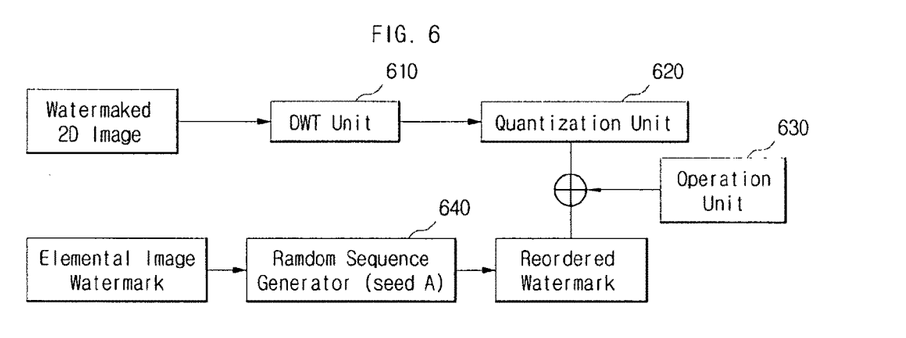
FIG. 6 shows a block diagram of an operational example of an extraction process unit shown in FIG. 2.

FIG. 6 is a block diagram showing an operational example of the extraction process unit. The block diagram illustrates how an elemental image watermark is extracted from an image, to which the elemental image watermark is inserted.

First, a DWT coefficient is obtained by performing DWT on a 2D digital image, to which the elemental image watermark is embedded, in the same way as EQ. 1. Then, after quantizing the DWT coefficient at a quantization unit 620, the final frequency component of $F_q(u,v)$ is obtained.

When a watermarked image is embedded to a frequency component, to which DWT is performed on the original image, the frequency component value is changed to an odd number if the elemental image watermark value is 1, and the frequency component value is changed to an even number if the elemental image watermark value is 0. Therefore, a rearranged elemental image watermark, X', can be obtained by performing an AND arithmetic of 1 and $F^*(u,v)$, which is a frequency transform value to which the elemental image watermark is embedded. The following EQ. 1 illustrates the above process.

$$X'_{L+i}=F'_{L+i}\Lambda 1 \text{ (where } i=1,2,\ldots,K) \quad \text{EQ. 3}$$

The obtained X' is randomly transformed using the random sequence generator 410 when the elemental image watermark is inserted, and thus a seed value that is the same as the seed value of when the elemental image watermark is inserted has to be inserted in order to rearrange X' in the same order, through which the desired watermark can be extracted.

4. Computational Reconstruction of the Extracted Elemental Image Watermark

The extracted elemental image watermark is a combination of small images of different shapes. To find embedded information from this group of small images, a computational reconstruction process is required.

Figure 7:
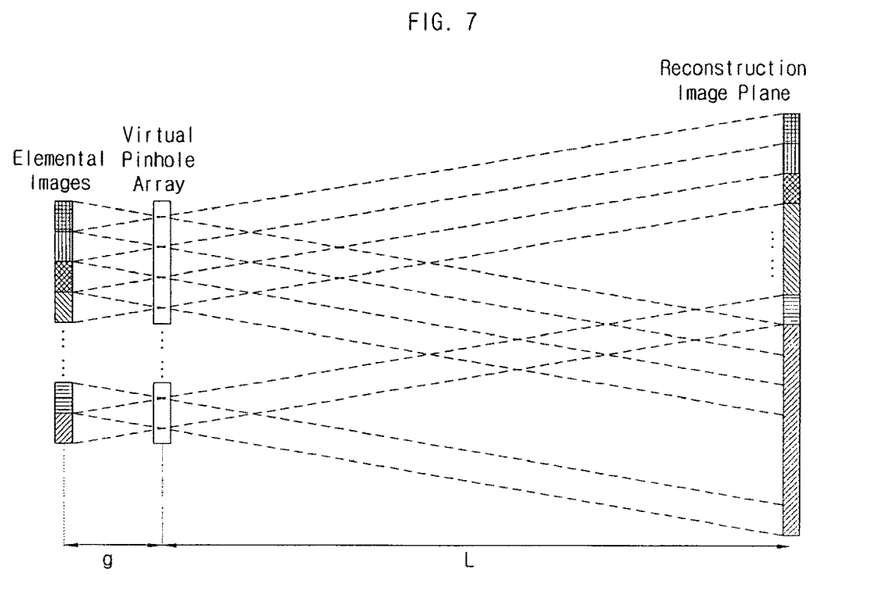
FIG. 7 shows a conceptual diagram of an operational example of a computational reconstruction unit shown in FIG. 7.

FIG. 7 is a conceptual diagram of how the computational reconstruction, shown in FIG. 2, operates. That is, it shows how a reconstructed image is computationally obtained from elemental images. The method shown in FIG. 7 is a pinhole arrangement model used in the CIIR (computational integral imaging reconstruction) method.

Each elemental image obtained through an optical pickup with a fixed distance of L is passed through an arrangement of virtual pinholes, and its inversed image is projected. The projected elemental image is enlarged according to the ratio between L, which is a distance between the virtual pinhole arrangement and a reconstruction image plane, and g, which is a distance between the virtual pinhole arrangement and an elemental image plane. Each enlarged image is added pixel by pixel. The same reconstruction process is repeated for different image planes in order to display an image of a 3D object. After the computational reconstruction process, the inserted information is obtained.

Figure 8:
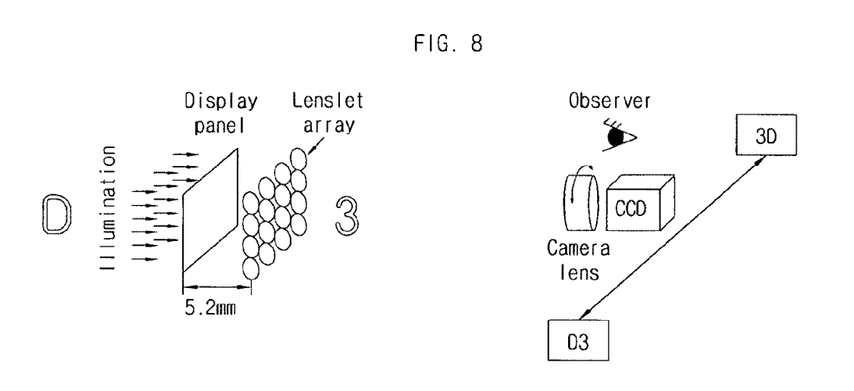
FIG. 8 shows examples of displaying an integrated image shown in FIG. 2.

FIG. 8 shows examples of displaying the integrated image of FIG. 2.

An integrated image usually consists of a pickup process and a display process, as shown in FIG. 1. The pickup process of the integrated image consists of a 2D sensor and a lenslet array. Through the 2D image sensor, the limited amount of light entered through 3D objects is picked up through the lenslet array. The light is stored as a digital image, which consists of elemental images having information of 3D objects. The obtained image is used as the watermarked image. The watermark can be reconstructed using an optical reconstruction method after the watermark is extracted, that is, it becomes a process of displaying an integrated image. The displaying process of the integrated image is an inverse process of picking up the integrated image. The watermarked image, having elemental images, is displayed on the display device for reconstructing 3D images, and is displayed in the front side of the lenslet array. In other words, the 3D watermarked image is shown differently based on the viewing angle.

As shown in FIG. 8, for example, if the observer observes the object on the left side, the pattern in the front appears to be on the right side of the pattern in the back, and if the observer moves to the right side, the pattern in the front appears to be on the left side of the pattern in the back. Some of the dispersed information can be found using this phenomenon.

In the mean time, a computational reconstruction method, which models the method of optically picking up and reconstructing elemental images, has been studied and reported. As shown in FIG. 3(*b*), the computational pickup method represents a CG pickup method for generating an elemental image watermark in accordance with an embodiment of the present invention. Suppose that the elemental images of the inserted information are CG-picked up on the $k^{th}$ pinhole. Rays of the object will be inversed and projected on the pickup plane through the pinhole. Obtained by repeating the same method for every pinhole are the entire elemental images, which become the elemental image watermark. Moreover, for the reconstruction method of the elemental image watermark, both the optical reconstruction method and the computational reconstruction method can be used. In the computational reconstruction method, a 3D image is reconstructed on a plane at a fixed distance.

2D image data has been generally used for the watermark. In one embodiment, the watermark, however, uses elemental images, which are 3D information. By using the integrated image technology, the elemental images picked up from 3D information are used as a new watermark for protecting elemental images. Since the elemental images include 3D information, using the elemental images has an effect of dispersing the inputted information, as in the holograph method. If the inputted information is dispersed in the watermark, the inputted information can be reconstructed with some of the information, not with all of the information.

Figure 9:
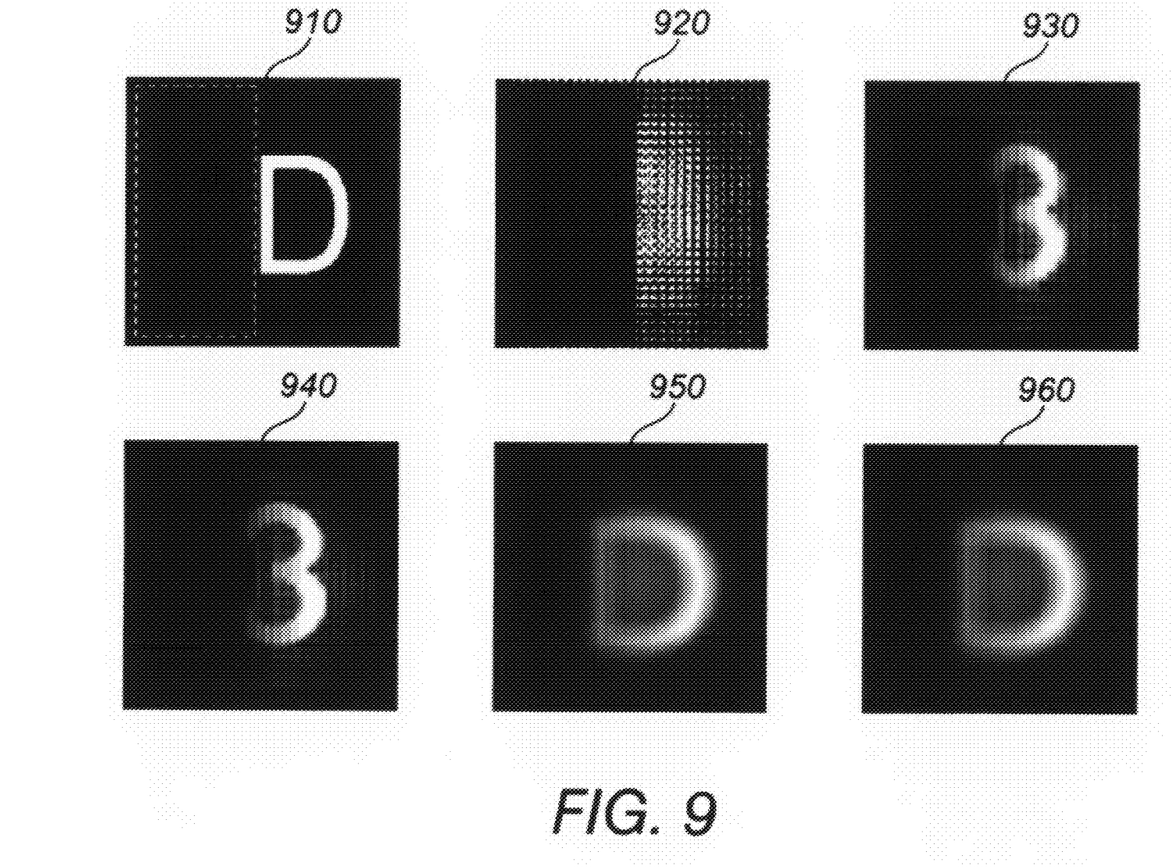
FIG. 9 shows experiments of information dispersion characteristics of an integrated image watermark in accordance with an embodiment of the present invention.

FIG. 9 shows experiments of information dispersion characteristics of an elemental image watermark in accordance with an embodiment of the present invention. In the worst case of the conventional 2D watermark, the extracted watermark can be concentrated in an area due to noise, as shown in the first experiment 910. In this case, the information may be completely lost. If the elemental image watermark is used, however, the information can be recovered, as shown in the second experiment 920, through computational reconstruction although the information is heavily lost in one area. The third to sixth experiment 930 to 960 show images obtained by computational reconstruction. The inserted information can be reconstructed through the reconstructed images based on the distance of the elemental image watermark because information is dispersed when the elemental image watermark is used.

Although certain embodiments of the present invention have been described, anyone of ordinary skill in the art to which the invention pertains should be able to understand that a very large number of permutations are possible without departing the spirit and scope of the present invention, which shall only be defined by the claims appended below.

What is claimed is:

1. A watermarking apparatus using elemental images of an integrated image having three-dimensional information as a watermark, the watermarking apparatus comprising:
    a pickup configured to computationally pick up an elemental image watermark by three-dimensionally placing an object;
    a first processor configured to embed the elemental image watermark into a two-dimensional image;
    a second processor configured to extract the embedded elemental image watermark from the two-dimensional image; and
    a third processor configured to computationally reconstruct the extracted elemental image watermark to a distance-based image; wherein the first processor comprises: a random sequence generator configured to generate a random sequence for the elemental image watermark and rearrange the elemental image watermark;
    a discrete wavelet transform (DWT) unit configured to perform DWT function on a two-dimensional image;
    a quantizer configured to quantize an output of the DWT unit; and
    an inverse DWT (IDWT) unit configured to i) receive the rearranged elemental image watermark and the quantized value, ii) perform IDWT function on the received data, and iii) output a watermarked two dimensional image.

2. The apparatus of claim 1, wherein the pickup is further configured to obtain the elemental image watermark by direct pickup, which obtains elemental images by photographing an actual object, or by computational reconstruction pickup, which produces elemental images by constructing a virtual three-dimensional object.

3. The apparatus of claims 1, wherein the pickup is further configured to computationally reconstruct an image from elemental images by modeling a pinhole arrangement.

4. The apparatus of claims 1, wherein the second processor is further configured to extract the embedded elemental image watermark by passing the two-dimensional image through a transmission channel.

5. A method of watermarking using elemental images of an integrated image having three-dimensional information as a watermark, the method comprising:
    computationally picking up an elemental image watermark by three-dimensionally placing an object;
    embedding the elemental image watermark into a two-dimensional image;
    obtaining the embedded elemental image watermark from the two-dimensional image; and
    computationally reconstructing the obtained elemental image watermark to a distance-based image; wherein the embedding comprises: generating a random sequence for the elemental image watermark and rearranging the elemental image watermark;
    performing discrete wavelet transform (DWT) function on a two-dimensional image;
    quantizing the two-dimensional image;
    receiving the rearranged elemental image watermark and the quantized value;
    performing inverse DWT (IDWT) function on the received data; and
    outputting a watermarked two-dimensional image.

6. The method of claim 5, wherein the computationally picking up obtains the elemental image watermark by direct pickup, which obtains elemental images by photographing an actual object, or by computational reconstruction pickup, which produces elemental images by constructing a virtual three-dimensional object.

7. The method of claim 5, wherein the picking up computationally reconstructs an image from elemental images by modeling a pinhole arrangement.

8. The method of claim 5, wherein the obtaining comprises extracting the embedded elemental image watermark by passing the two-dimensional image through a transmission channel.

9. A watermarking apparatus using elemental images of an integrated image having three-dimensional information as a watermark, the watermarking apparatus comprising:
    means for computationally picking up an elemental image watermark by three-dimensionally placing an object;
    means for embedding the elemental image watermark into a two-dimensional image;
    means for obtaining the embedded elemental image watermark from the two-dimensional image; and
    means for computationally reconstructing the obtained elemental image watermark to a distance-based image.

* * * * *